(12) United States Patent
Chen

(10) Patent No.: US 12,503,379 B2
(45) Date of Patent: Dec. 23, 2025

(54) ELECTROCHEMICALLY ACTIVATED PERSULFATE FOR ADVANCED OXIDATION PROCESSES

(71) Applicant: Evoqua Water Technologies LLC, Pittsburgh, PA (US)

(72) Inventor: Yang Chen, Lowell (SG)

(73) Assignee: Evoqua Water Technologies LLC, Pittsburgh, PA (US)

( * ) Notice: Subject to any disclaimer, the term of this patent is extended or adjusted under 35 U.S.C. 154(b) by 318 days.

(21) Appl. No.: 17/620,738

(22) PCT Filed: Jun. 17, 2020

(86) PCT No.: PCT/US2020/038029
§ 371 (c)(1),
(2) Date: Dec. 19, 2021

(87) PCT Pub. No.: WO2020/257218
PCT Pub. Date: Dec. 24, 2020

(65) Prior Publication Data
US 2022/0306498 A1    Sep. 29, 2022

Related U.S. Application Data

(60) Provisional application No. 62/863,459, filed on Jun. 19, 2019.

(51) Int. Cl.
*C02F 1/467* (2023.01)
*C02F 1/461* (2023.01)
(Continued)

(52) U.S. Cl.
CPC ........ *C02F 1/4672* (2013.01); *C02F 1/46109* (2013.01); *C02F 1/66* (2013.01);
(Continued)

(58) Field of Classification Search
CPC .................. C02F 1/4672; C02F 1/467; C02F 1/4676–1/4678
See application file for complete search history.

(56) References Cited

U.S. PATENT DOCUMENTS

| 4,445,990 A | 5/1984 | Kim et al. |
| 2011/0024361 A1* | 2/2011 | Schwartzel ............. C02F 1/467 204/290.01 |

(Continued)

FOREIGN PATENT DOCUMENTS

| CN | 103342405 A | 10/2013 |
| CN | 108033522 A | 5/2018 |

(Continued)

OTHER PUBLICATIONS

Shin et al ("Electrochemical oxidation of organics in sulfate solutions on boron-doped diamond electrode: Multiple pathways for sulfate radical generation", Applied Catalysis B: Environmental, 254, Apr. 2019, pp. 156-165) (Year: 2019).*

(Continued)

*Primary Examiner* — Alexander W Keeling

(57) ABSTRACT

Water treatment systems are disclosed. The system includes an electrochemical cell having an inlet and an outlet, a cathode comprising a catalytic material for electrochemical generation of persulfate free radicals, and an anode, a source of a persulfate positioned upstream of the electrochemical cell, first contaminant concentration sensor positioned upstream of the electrochemical cell, and a controller operatively coupled to receive one or more input signals from at least the first contaminant concentration sensor. Methods of treating water using the electrochemical cell disclosed herein are disclosed. Methods of facilitating water treatment by providing the electrochemical cell disclosed herein are disclosed. Methods of retrofitting a water treatment system (Continued)

having an AOP by providing the electrochemical cell disclosed herein are disclosed.

16 Claims, 13 Drawing Sheets

(51) Int. Cl.
C02F 1/66 (2023.01)
C02F 101/30 (2006.01)
C02F 101/34 (2006.01)
C02F 101/36 (2006.01)
C02F 101/38 (2006.01)
C02F 103/34 (2006.01)

(52) U.S. Cl.
CPC ............ C02F 2001/46142 (2013.01); C02F 2101/308 (2013.01); C02F 2101/34 (2013.01); C02F 2101/36 (2013.01); C02F 2101/38 (2013.01); C02F 2103/343 (2013.01); C02F 2201/46135 (2013.01); C02F 2201/4614 (2013.01); C02F 2201/46145 (2013.01); C02F 2201/4618 (2013.01); C02F 2209/001 (2013.01); C02F 2209/06 (2013.01); C02F 2209/08 (2013.01)

(56) References Cited

U.S. PATENT DOCUMENTS

| | | | |
|---|---|---|---|
| 2011/0108438 A1 | 5/2011 | Tretheway et al. | |
| 2012/0211367 A1 | 8/2012 | Vecitis | |
| 2013/0299361 A1 | 11/2013 | Wylie et al. | |
| 2016/0207813 A1 | 7/2016 | Szcesniak et al. | |
| 2017/0107137 A1* | 4/2017 | Jung | C25B 9/23 |
| 2017/0247273 A1 | 8/2017 | Angelidaki et al. | |
| 2018/0178184 A1 | 6/2018 | Holland | |
| 2018/0222781 A1 | 8/2018 | Liu et al. | |
| 2019/0218127 A1 | 7/2019 | Wood et al. | |
| 2020/0399147 A1* | 12/2020 | Yost | C02F 1/4672 |

FOREIGN PATENT DOCUMENTS

| | | | | |
|---|---|---|---|---|
| CN | 108083388 A | 5/2018 | | |
| CN | 109179805 A | 1/2019 | | |
| WO | WO-0034184 A1 * | 6/2000 | ......... | C02F 1/46104 |
| WO | 2020041712 A1 | 2/2020 | | |
| WO | 2020186162 A1 | 9/2020 | | |
| WO | 2020257218 A1 | 12/2020 | | |
| WO | 2021025991 A1 | 2/2021 | | |

OTHER PUBLICATIONS

International Search Report in corresponding PCT/US20/38029, dated Nov. 24, 2020.
Unknown, "First Office Action", Chinese Patent Application No. 202080052092.1, mailed Nov. 27, 2023, 24 pages.
International Search Report, corresponding PCT Application No. PCT/US21/55665, dated Feb. 17, 2022.
Lloyd, R. et al, "The Origin of the Hydroxyl Radical Oxygen in the Fenton Reaction;" https://www.sciencedirect.com/science/article/abs/pii/S0891584996004327, Free Radical Biology and Medicine, vol. 22, Issue 5, 1997, pp. 885-888.
Fischbacher, A., et al., "The •OH Radical Yield in the H2O2+O3 (Peroxone) Reaction;" https://pubs.acs.org/doi/abs/10.1021/es402305r, Environmental Science & Technology, vol. 4, Issue 17, Sep. 3, 2013.
Nurhayati, E., "A Brief Review on Electro-generated Hydroxyl Radical for Organic Wastewater Mineralization;" https://www.researchgate.net/publication/309753772_A_Brief_Review_on_Electro-generated_Hydroxyl_Radical_for_Organic_Wastewater_Mineralization, Jurnal Sains dan Teknologi Lingkungn, vol. 4, No. 1, Jan. 2012, pp. 24-31.
Rosenfeldt, E., et al., "Comparison of the Efficiency of *OH Radical Formation During Ozonation and the Advanced Oxidation Processes O3/H2O2 and UV/H2O2," https://pubmed.ncbi.nlm.nih.gov/17078993/, Water Research, vol. 40, Issue 20, Dec. 2006, pp. 3695-3704.
Pollitt, K., et al., "1,4-Dioxane as an Emerging Water Contaminant: State of the Science and Evaluation of Research Needs;" https://www.sciencedirect.com/science/article/abs/pii/S0048969719330165, Science of the Total Enfironment, vol. 690, Nov. 10, 2019, pp. 853-866.
Unknown, "Second Office Action", Chinese Patent Application No. 202080052092.1, mailed Aug. 27, 2024, 29 pages.
Liu, Shanshan et al., "Enhancement of photoelectrocatalytic degradation of diclofenac with persulfate activated by Cu cathode", Chemical Engineering Journal, vol. 320, pp. 168-177.
Unknown, "Third Office Action", Chinese Patent Application No. 202080052092.1, mailed Jan. 21, 2025.
Pangan, Patrick, "Requisition by the Examiner", Canadian Patent Application No. 3,140,327, mailed Mar. 11, 2025.
Unknown, "Rejection Decision", Chinese Patent Application No. 202080052092.1, mailed Apr. 25, 2025.
Chau, Thanh-Tam, "Examination Report No. 1", Australian Patent Application No. 2020295387, mailed on May 16, 2025.

* cited by examiner

ELECTROCHEMICALLY ACTIVATED PERSULFATE FOR ADVANCED OXIDATION PROCESSES

CROSS-REFERENCE TO RELATED APPLICATIONS

This application claims priority under 35 U.S.C. § 119(e) to U.S. Provisional Patent Application Ser. No. 62/863,459 titled "Electro Activated Persulfate Process using a Copper Catalyst for Advanced Oxidation" filed Jun. 19, 2019, the entire disclosure of which is hereby incorporated herein by reference in its entirety for all purposes.

FIELD OF TECHNOLOGY

Aspects and embodiments disclosed herein are generally related to the field of the advanced oxidation processes for the removal of organic compounds from water.

SUMMARY

In accordance with one aspect, there is provided a system for treating water. The system may comprise an electrochemical cell having an inlet and an outlet, the inlet of the electrochemical cell fluidly connectable to a source of water comprising at least one contaminant, a source of a persulfate positioned upstream of the electrochemical cell and fluidly connectable to the source of water, a first contaminant concentration sensor positioned upstream of the electrochemical cell and fluidly connectable to the source of water, and a controller operatively coupled to receive one or more input signals from at least the first contaminant concentration sensor. The electrochemical cell may comprise a cathode comprising a catalytic material for the electrochemical generation of persulfate free radicals and an anode. The controller may be operable to generate a control signal that regulates at least a rate of introduction of water from the source of water, a rate of persulfate introduction to the source of water, and a potential applied to the electrochemical cell based on the one or more input signals.

In some embodiments, the first contaminant concentration sensor comprises an organic contaminant concentration sensor.

In some embodiments, the persulfate comprises at least one of ammonium persulfate, potassium persulfate, and sodium persulfate. In some embodiments, the cathode catalytic material comprises a metal selected from the group consisting of iron, copper, nickel, cobalt, and metal alloys. In particular embodiments, the cathode material comprises copper. In some embodiments, the anode comprises one of platinum, a Magneli phase titanium oxide, a mixed metal oxide (MMO) coated dimensionally stable anode (DSA) material, graphite, boron doped diamond (BDD), or lead/lead oxide.

In further embodiments, the system may comprise a first water flow sensor positioned upstream of the electrochemical cell and fluidly connectable to the source of water. The controller may be further operable to receive at least one input signal from the first water flow sensor to generate a control signal that regulates at least the rate of introduction of water from the source of water.

In further embodiments, the system may comprise a current sensor coupled to the electrochemical cell. The controller may be further operable to receive at least one input signal from the current sensor to generate a control signal that regulates at least the potential applied to the electrochemical cell.

In further embodiments, the system may comprise a persulfate concentration sensor fluidly connectable to the source of water. The controller may be further operable to receive at least one input signal from the persulfate concentration sensor to generate a control signal that regulates at least the rate of persulfate introduction to the source of water.

In further embodiments, the system may comprise a second water flow sensor positioned downstream of the electrochemical cell. The controller may be further operable to receive at least one input signal from the second water flow sensor to generate a control signal that regulates at least the rate of introduction of water from the source of water, the rate of persulfate introduction to the source of water, and the potential applied to the electrochemical cell.

In further embodiments, the system may comprise a second contaminant concentration sensor positioned downstream of the outlet of the electrochemical cell and fluidly connectable to the outlet of the electrochemical cell. The controller may be further operable to receive at least one input signal from the second contaminant concentration sensor to generate a control signal that regulates at least the rate of introduction of water from the source of water, the rate of persulfate introduction to the source of water, and the potential applied to the electrochemical cell.

In further embodiments, the system may comprise a first pH sensor positioned upstream of the electrochemical cell and fluidly connectable to the source of water. In certain embodiments, the system includes a first pH adjustment unit positioned upstream of the electrochemical cell and fluidly connectable to the source of water. The first pH adjustment unit is configured to adjust the pH of the source of water to a pH less than 7. The controller may be further operable to receive at least one input signal from the first pH sensor to generate a control signal that regulates a rate the pH adjuster is introduced from the first pH adjustment unit to the source of water. In further embodiments, the system may include a second pH sensor and a second pH adjustment unit positioned downstream of the outlet of the electrochemical cell.

In further embodiments, the system may comprise a conductivity sensor positioned upstream of the electrochemical cell and fluidly connectable to the source of water. In certain embodiments, the system includes a conductivity adjustment unit fluidly connectable to the electrochemical cell. The controller may further operable to receive at least one input signal from the conductivity sensor to generate a control signal that regulates a rate the conductivity adjuster is introduced from the conductivity adjustment unit to the source of water.

In some embodiments, the electrochemical cell further includes a reference electrode.

In some embodiments, the system includes a plurality of electrochemical cells.

In further embodiments, the system includes a treatment vessel positioned downstream of the electrochemical cell and fluidly connectable to the outlet of the electrochemical cell.

In accordance with another aspect, there is provided a method of treating water. The method may comprise providing water from a source of water comprising at least one contaminant. The method may further comprise measuring a concentration of the at least one contaminant in the water from the source of water. The method may additionally comprise introducing a persulfate to the water at a concentration based on a signal representative of at least the measured concentration of the at least one contaminant in the water to produce a first treated water. The method may further comprise introducing the first treated water to an inlet of an electrochemical cell. The method may additionally comprise electrochemically generating persulfate free radicals from the persulfate in the electrochemical cell at an electrode comprising a catalytic material to produce a second treated water.

In further embodiments, the method includes adjusting the concentration of the persulfate introduced to the water based on at least a signal generated from a measured concentration of the at least one contaminant in the second treated water.

In further embodiments, the method includes adjusting a potential applied to the electrochemical cell based on at least a signal generated from the measured concentration of the at least one contaminant in the second treated water.

In further embodiments, the method includes adjusting a rate of introduction of water from the source of water based on at least a signal generated from the measured concentration of the at least one contaminant in the second treated water.

In some embodiments, the persulfate comprises at least one of ammonium persulfate, sodium persulfate, and potassium persulfate. In some embodiments, the persulfate free radicals are generated at a cathode in the electrochemical cell. In some embodiments, the at least one contaminant comprises an organic contaminant.

In further embodiments, the method includes introducing a pH adjuster to the water from the source of water. The pH adjuster may adjust the pH of the water from the source of water to a value less than 7. In further embodiments, the method includes introducing a conductivity adjuster to the water from the source of water.

In further embodiments, the method includes introducing the second treated water from the electrochemical cell into a treatment vessel positioned downstream of the electrochemical cell. The pH of the second treated water introduced to the treatment vessel may be adjusted.

In accordance with another aspect, there is provided a method of facilitating water treatment. The method may comprise providing a water treatment system, the system comprising an electrochemical cell configured to electrochemically activate a persulfate introduced to a source of water comprising at least one contaminant at an electrode comprising a catalytic material for electrochemical generation of persulfate free radicals. The method may further comprise providing at least one of a first contaminant concentration sensor, a first water flow sensor, a current sensor, and a persulfate concentration sensor. The method may additionally comprise providing a controller configured to regulate at least the introduction of water from the source of water, an amount of the persulfate introduced, and a potential applied to the electrochemical cell responsive to at least a measured contaminant concentration of the water. The method may further comprise instructing a user to fluidly connect the electrochemical cell to the source of water. The method may additionally comprise instructing a user to connect the water treatment system to the controller.

In further embodiments, the method includes providing the persulfate.

In some embodiments, the provided controller may be further configured to regulate at least the introduction of water from the source of water, an amount of the persulfate introduced, and a potential applied to the electrochemical cell responsive to at least one of a measured water flow rate, a measured persulfate concentration, and a measured current of the electrochemical cell.

In accordance with another aspect, a method of retrofitting a water treatment system comprising an advanced oxidation process (AOP) in fluid communication with a source of water comprising at least one contaminant is provided. The method may comprise providing an electrochemical cell including a cathode comprising a catalytic material for electrochemical generation of persulfate free radicals. The method may further comprise fluidly connecting the electrochemical cell to the source of water. The method may additionally comprise providing instructions to operate the electrochemical cell to activate a persulfate introduced into the source of water to produce a treated water.

In further embodiments, the method includes replacing an ultraviolet (UV) AOP from the water treatment system.

In some embodiments, the electrochemical cell is provided with a cathode that comprises a metal selected from the group consisting of iron, copper, nickel, cobalt, and alloys thereof. In some embodiments, the electrochemical cell is provided with an anode that comprises one of platinum, a Magneli phase titanium oxide, a MMO coated DSA material, graphite, BDD, or lead/lead oxide.

In further embodiments, the method includes providing the persulfate. In further embodiments, the method includes providing a controller configured to regulate at least a rate of introduction of water from the source of water, a rate the persulfate is introduced to the source of water, and a potential applied to the electrochemical cell.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

It will be recognized by the person of ordinary skill in the art, given the benefit of this disclosure, that the figures are purely for illustrative purposes. Other features may be present in the embodiments disclosed herein without departing from the scope of the description.

DETAILED DESCRIPTION

Advanced oxidation processes (AOP) are increasingly being used for the destruction or inactivation of undesirable organic compounds. These organic compounds can be found in high purity water such as water used in semiconductor manufacturing or in drinking water. These organic compounds may comprise endocrine disrupting chemicals and are also be found in wastewater. AOP technologies include such treatments as ultraviolet (UV) irradiation and ultrasonic cavitation as two examples. Ultraviolet light systems can be utilized with oxidants such as persulfate, ozone, or hydrogen peroxide to generate radical species upon exposure to UV light that destroy or inactivate organic compounds.

Figure 1:
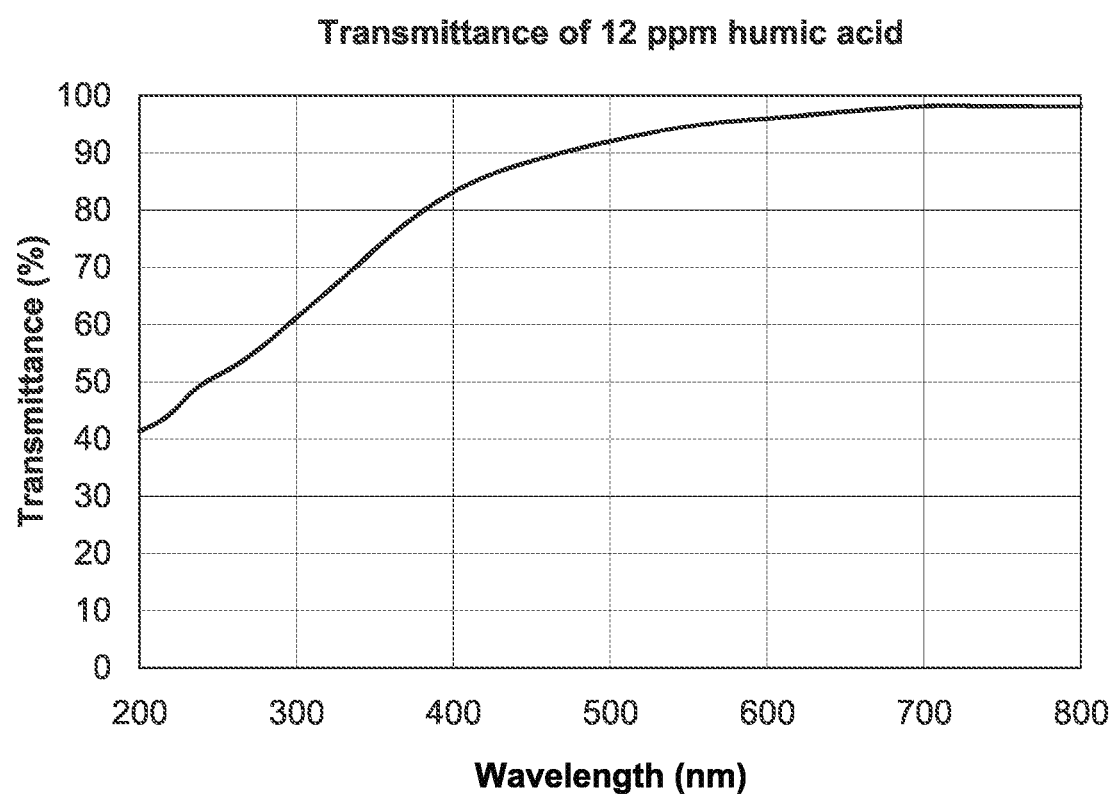
FIG. 1 illustrates the UV transmittance though a solution of 12 ppm humic acid in water as a function of wavelength.

Activated free radical processes for advanced water treatment is generally achieved by UV activating peroxide or persulfate to produce hydroxyl or persulfate free radicals as oxidants to mineralize organic species found in polluted water. UV-AOP is intrinsically limited by lamp efficiency for specific wavelengths that can convert, for example, peroxide or persulfate molecules to their free radical form. For example, the UV lamp efficiency for the activation of persulfate is approximately 10-30% in water with low turbidity. This limitation may be solved in the future when light emitting diodes (LEDs) with the required wavelengths become commercially available. Notably, UV-AOP is also limited by UV transmittance in water. For example, as illustrated in FIG. 1, the UV transmittance in deionized water containing 12 ppm humic acid over a 13 mm path length is lower than 66% at UV wavelengths less than 320 nm. The decreased transmittance reduces the process efficiency of the UV-AOP scheme, increases energy expenditures, and thus limits applications where it can be utilized.

In accordance with one or more embodiments, systems and methods disclosed herein relate to the removal of organic compounds from a source of contaminated water. In accordance with one or more embodiments, water to be treated may contain one or more target compounds. For example, water from a source of water may contain various organic compounds, for example, t-butanol and naturally occurring high molecular weight organic compounds, for example humic acid or fulvic acid. The water may also contain man-made organic molecules such as 1,2,4-triazole or perfluoro alkyl substances (PFAS), for example perfluorooctanoic acid (PFOA). This invention is not limited to the types of organic compounds being treated.

AOP processes generally utilize activation of an oxidizing salt for the destruction or elimination of various organic species. Any salt that can initiate as a precursor to produce a strong oxidant may be used in the systems and methods disclosed herein. In some non-limiting embodiments, a persulfate compound, that is, a persulfate salt, may be used as the oxidant. In at least some embodiments, one of at least ammonium persulfate, sodium persulfate, and/or potassium persulfate may be used as the oxidant. Other strong oxidants, for example, oxygen gas, ozone, or hydrogen peroxide, may also be used as the oxidant. The water from the source of water may be dosed with the oxidant.

When persulfate is chosen as the oxidant for systems and methods described herein, the activation into its radical forms generally occurs according to the following reaction pathways:

$$S_2O_8^{2-} + e \rightarrow SO_4^{\cdot -} + SO_4^{2-} \quad \text{Eq. 1}$$

$$SO_4^{\cdot -} + e \rightarrow SO_4^{2-} \quad \text{Eq. 2}$$

$$S_2O_8^{2-} + 2e \rightarrow 2SO_4^{2-} \quad \text{Eq. 3}$$

$$2H^+ + 2e \rightarrow H_2 \quad \text{Eq. 4 (competing reaction)}$$

Figure 2:
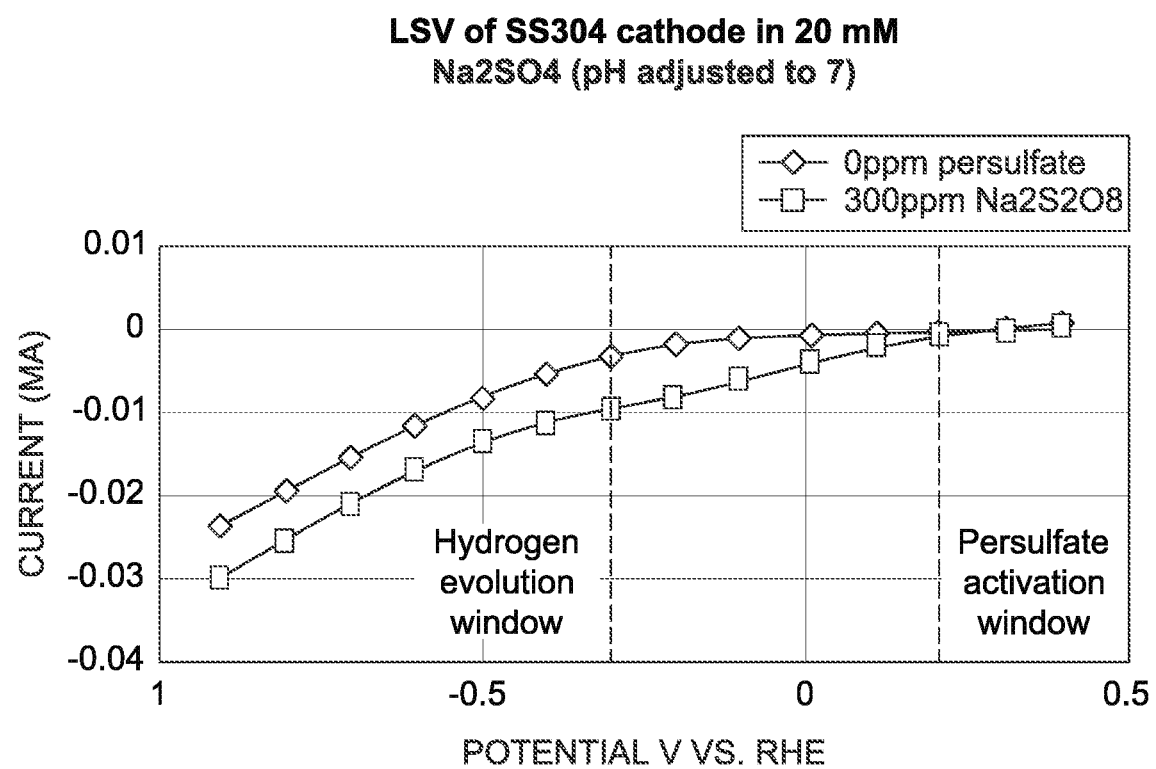
FIG. 2 illustrates a linear sweep voltammogram in an electrochemical cell using an iron alloy cathode, according to one embodiment.

In systems including an electrochemical cell as described herein, these reactions generally occur on the surfaces of the cathode, and the cathode material may be chosen to be a catalytic material that may promote activation of persulfate to the persulfate free radical. As is seen in Eq. 1-4, the kinetics of the activation to persulfate should be controlled to reduce the production of inactive sulfate ions (Eq. 2 and 3) and reduce the evolution of hydrogen gas from reduction of hydrogen ions due to water splitting (Eq. 4). As shown in FIG. 2, which illustrates a linear sweep voltammogram of persulfate activation on a stainless steel 304 (SS304) cathode, cathodic reduction of persulfate may occur in the potential window indicated by the vertical dashed arrows, with a lower overpotential preferred. Overpotential may generally relate to the potential difference, that is, the voltage, between a half-reaction's thermodynamically determined reduction potential and the potential at which a redox event is experimentally conducted and may be directly related to an electrochemical cell's voltage efficiency. FIG. 2 indicates that electron transfer to persulfate anions starts from +0.3 V vs. RHE (in FIG. 2, the electrolyte is 20 mM Na$_2$SO$_4$ with the pH adjusted to 7 by NaOH). Beyond −0.2 V, hydrogen evolution would start to take over as the major cathodic reaction on the cathode surface instead of the reductive activation of persulfate anions.

A system of the invention may include an electrochemical cell having an inlet and an outlet, the inlet of the electrochemical cell fluidly connectable to a source of water comprising at least one contaminant, a source of a persulfate positioned upstream of the electrochemical cell and fluidly connectable to the source of water, a first contaminant concentration sensor positioned upstream of the electrochemical cell and fluidly connectable to the source of water, and a controller operatively coupled to receive one or more input signals from at least the first contaminant concentration sensor. The electrochemical cell may comprise a cathode comprising a catalytic material for electrochemical generation of persulfate free radicals and an anode. The controller may be operable to generate a control signal that regulates at least a rate of introduction of water from the source of water, a rate of persulfate introduction to the source of water, and a potential applied to electrochemical cell based on the one or more input signals.

As noted herein, persulfate radical generation using UV light may be limited by the UV transmittance of the source water. Electrochemical generation of persulfate radicals may occur in water of any transmittance level and the persulfate activation efficiency shall not be influenced by water transmittance. For example, electrochemical generation of persulfate radicals may occur in water than is opaque or cloudy, for example, highly turbid water, which would substantially reduce UV transmittance. In some implementations, the electrochemical cell may have a persulfate free radical generation efficiency that is greater than that of other radical generation processes, such as UV radical generation or the like where the efficiency is correlated to transmittance through the water matrix.

Systems of the invention may include any number of sensors for measuring one or more parameters of the system and processes occurring within. Sensors are generally configured to measure a property and deliver a signal representative of that property to a controller or other device configured to regulate or monitor operation of the system. Sensors may be positioned at any practical location in the system, such as upstream of the electrochemical cell, downstream of the electrochemical cell, or on a component of the electrochemical cell. For example, the first contaminant concentration sensor may be a sensor that is non-specific to any particular species, such as a total organic carbon (TOC) sensor. Alternatively, or in addition, the system may include one or more chemical specific sensors. One of skill in the art can appreciate that the number and specificity of sensors for a system may be chosen based on known contaminants or other properties of the source of water. In some embodiments, a system of the invention may include a first water flow sensor positioned upstream of the electrochemical cell and fluidly connectable to the source of water. The first water flow sensor may be configured to measure the flow rate of water from the source of water that enters the electrochemical cell. In some embodiments, a system of the invention may include a current sensor coupled to the electrochemical cell, that is, coupled to at least one electrode of the electrochemical cell. The current sensor may be configured to measure at least the current applied to an electrode, such as the cathode, of the electrochemical cell. In some embodiments, a system of the invention may include a persulfate concentration sensor fluidly connectable to the source of water. The persulfate concentration sensor may be configured to measure the amount of persulfate added to the water from the source of water. In further embodiments, the system may include a second contaminant concentration sensor positioned downstream of the electrochemical cell. The second contaminant sensor may be used to determine if the electrochemically treated water has been sufficiently treated and is ready for discharge or if the treated water requires further treatment, such as further treatment in one more additional electrochemical cells as described herein or any other water treatment system known to one of skill in the art. The second contaminant sensor may be a non-specific sensor, such as a TOC sensor, or may comprise one or more chemical specific sensors.

A system of the invention including an electrochemical cell may include more than one electrochemical cell connected in any practical arrangement. For example, a system may include a plurality of electrochemical cells connected in series to provide for different stages of treatment in each electrochemical cell. Alternatively, or in addition, a system may include a plurality of electrochemical cells connected in parallel to increase overall treatment throughput of the water treatment system. The invention is in no way limited to the number and possible configurations of a plurality of electrochemical cells, and one of skill in the art can appreciate that any number of electrochemical cells and any number of possible electrochemical cell configurations can be utilized to achieve a desired level of filtration performance and/or resulting water quality.

In some embodiments, the electrochemical cell may include a reference electrode, for example, in proximity to the cathode. A reference electrode may allow for continuous measurement of the potential of the working electrode, that is, the cathode, without passing current through it. The use of a reference electrode thus may allow for precise control over the cell voltage in water have a specific conductivity, therefore controlling the current that determines the reaction kinetics as described herein to limit competing reactions (Eq. 2-4 as described herein). In some cases, the electrodes of an electrochemical cell as described herein may achieve the highest efficiency for persulfate activation at an applied current when the applied potential on the cathode is in the range of −0.6 to −0.2 V vs. Ag/AgCl/1M KCl.

In some embodiments, the catalytic material for the cathode may include a metal selected from the group consisting of iron, copper, nickel, cobalt, and metal alloys. Alloys may be between any of iron, copper, nickel, cobalt and another metal or another suitable material. For example, an electrode may be steel, an alloy comprising at least iron and carbon. An exemplary cathode material is copper. The cathode may be formed in a variety of shapes, for example, planar or circular. In at least some embodiments, the cathode may be characterized by a foil, mesh, or foam structure, which may be associated with a higher active surface area, pore structure, and/or pore distribution that can provide ample active sites on the surface for the activation reactions to occur. For example, the cathode may have an active area of between 1 $cm^2$ to 1000 $cm^2$, inclusive.

In some embodiments, the anode may include a material selected from the group consisting of platinum, a Magnéli phase titanium oxide, a mixed metal oxide (MMO) coated dimensionally stable anode (DSA) material, graphite, boron doped diamond (BDD), or lead/lead oxide. DSA materials may be uncoated or may be coated with noble metals or metal oxides, such as $IrO_2$, among others. Magnéli phase titanium oxide electrodes and electrochemical cells comprising said electrodes are described in PCT/US2019/047922, the disclosure of which is herein incorporated by reference in its entirety for all purposes. An exemplary anode material is platinum, as its current-induced oxidation may be neglected at low current densities. Platinum may be used as a solid conductor or may be used as a coating on another electrode substrate, such as titanium.

Figure 3:
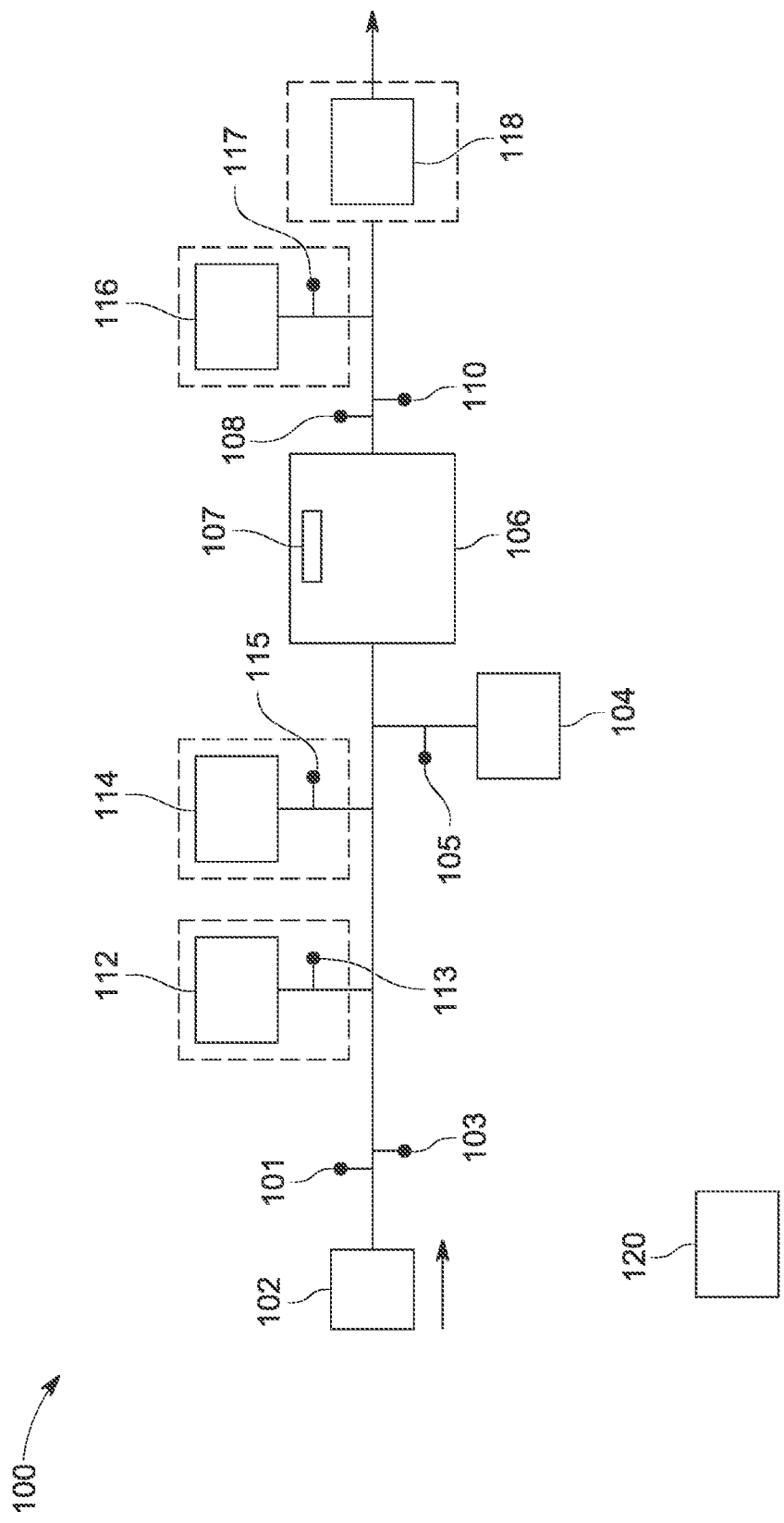
FIG. 3 illustrates a schematic of a system for treating water using an electrochemical cell, according to one embodiment.

An illustrative embodiment of a system of the invention incorporating an electrochemical cell is illustrated in FIG. 3. As illustrated in FIG. 3, a source of water 102 is fluidly connectable an inlet of an electrochemical cell 106 as described herein. The system includes a first contaminant concentration sensor 101 and a first water flow rate sensor 103 positioned upstream of the electrochemical cell 106 having a current sensor 107. The first contaminant concentration sensor 101 may be configured to measure the concentration of at least one contaminant present in the source of water entering the electrochemical cell 106. Without wishing to be bound by any particular theory, an amount of persulfate supplied to the source of water 102 from the source of persulfate 104 may be correlated with the measured contaminant concentration of the source of water 102. An appropriate amount of persulfate may be dosed to the electrochemical cell 106 from the source of the persulfate 104 that is fluidly connectable to the source of water 102. The amount of persulfate dosed to the water from the source of water 102 may be in an amount sufficient to reduce the contaminant concentration of the water to an acceptable level, such as a concentration provided by a regulatory standard. Alternatively, the amount of persulfate dosed to the water from the source of water 102 may be in excess of the amount required to reduce the contaminant concentration of the water to an acceptable level. The source of persulfate 104 may further include necessary controls, such as a persulfate concentration sensor 105, to measure the persulfate added to the water from the source of water 102. The persulfate may be stored in any appropriate vessel, such as a holding tank or the like and its dispersion into the source of water controlled by a suitable valve, for example a metering valve. Downstream of the outlet of the electrochemical cell 106, the system includes a second contaminant concertation sensor 108 and a second water flow rate sensor 110 that are configured to measure their respective properties of the treated water that is discharged from the electrochemical cell 106. The various components of the system may be controlled during operation by controller 120. Controller 120 may be operatively coupled to the various components of the system 100 such that input signals generated from sensors can be utilized during operation as described herein. The various system components may be connected to the controller 120 by any known connection type, for example, direct connection with a wire or cable, or over any known wireless data transmission standard. The types of connections between system components and a controller are known to those skilled in the art and the invention is not limited by the type of connections between system components and the controller.

As illustrated by the dashed line boxes in FIG. 3, the system 100 may optionally include additional components, such as a first pH adjustment unit 112 fluidly connectable to the source of water 102. The first pH adjustment unit 112 may be configured to adjust the pH of water from the source of water 102 prior to energizing the electrochemical cell 106. The pH of the water from the source of water 102 may be measured by a suitably constructed first pH meter or first pH sensor 113 positioned between the source of water 102 and the electrochemical cell 106. In some embodiments, the pH of the water from the source of water 102 may be adjusted to improve operation and/or performance of the electrochemical cell 106. As an example, for an electrochemical process as described herein, the pH of the water from the source of water 102 may be correlated to the type of cathode material used in the electrochemical cell 106. Without wishing to be bound by any particular theory, the pH of the water from the source of water 102 may be acidic, that is, a pH less than 7, for processing using an electrochemical cell having a copper cathode. In some implementations, the pH of the water from the source of water 102 may not require adjusting when processing using an electrochemical cell with an iron or iron alloy, that is, steel, nickel, cobalt, or other electrode materials. One of skill in the art can appreciate that the pH of the water from the source of water may be adjusted based on the particular electronic structure or other properties of the cathode material. The first pH adjustment unit as described herein may be configured to administer an amount of a pH adjuster to the water from the source of water to adjust the pH to the desired level. For example, the first pH adjustment unit may be configured to administer an acidic pH adjuster, such as $H_2SO_4$, into the water from the source of water. Other suitable pH adjusters are known in the art.

With continued reference to FIG. 3, and in some embodiments, the system 100 may optionally include a conductivity adjustment unit 114 fluidly connected to the source of water 102. The addition of a conductivity adjuster may lower the energy consumption required to operate the electrochemical cell without an adverse effect on electrochemical cell performance. The conductivity adjustment unit 114 may be configured to administer an amount of a conductivity adjuster, such as a salt, based on a measurement of the solution conductivity of the water from the source of water in the electrochemical cell. The conductivity of the water from the source of water 102 may be measured by a suitable conductivity meter or conductivity sensor 115 positioned at a suitable location between the source of water 102 and the electrochemical cell 106. The conductivity adjuster added to the water from the source of water 102 in the electrochemical cell 106 may be any suitable salt. For example, sulfate salts such as $Na_2SO_4$ may be added to the water from the source of water 102 in the electrochemical cell 106. Other suitable conductivity adjusters are known in the art.

With continued reference to FIG. 3, and in some embodiments, the system 100 may optionally include a treatment vessel 118 positioned downstream of the electrochemical cell 106. The treatment vessel 118 may be configured to receive water that has been treated with the electrochemical cell 106 for storage and/or the application of additional treatment processes prior to discharge. For example, the treatment vessel 118 may be fluidly connectable to at least one sensor for monitoring one or more parameters of the treated water. The at least one sensor may provide a signal or representation of the measured parameter of the electrochemically treated water. The at least one sensor may include, for example, conductivity meters, pH sensors, TOC sensors, chemical-specific sensors, or any other sensor, probe, or scientific instrument useful for providing an indication of a desired characteristic or parameter of water entering the treatment vessel 118 after treatment using the electrochemical cell. For example, and with continued reference to FIG. 3, the system 100 may include a second pH sensor 117 and a second pH adjustment unit 116 configured to adjust the pH of the electrochemically treated water to a desired pH level prior to discharge or other processing steps.

In accordance with one or more embodiments, there is provided a controller that may be configured to implement any of the methods and operate any of the systems described herein. The controller may be operatively coupled to receive one or more input signals from at least the first contaminant concentration sensor. The one or more input signals sent to the controller allow for the controller to generate a control signal that regulates at least a rate of introduction of water from the source of water, a rate of persulfate introduction to the source of water, and a potential applied to the electrochemical cell, for example, the potential applied to an electrode, based on the one or more input signals. The controller may be configured to receive any number of input signals from the sensors of the system. For example, the controller may be configured to receive input signals from sensors positioned upstream of the electrochemical cell, such as at least the first water flow sensor, the current sensor coupled to the electrochemical cell, and/or the persulfate concentration sensor. In some embodiments, the controller may be further operable to receive at least one input signal from the first water flow sensor to generate a control signal that regulates at least the rate of introduction of water from the source of water. In some embodiments, the controller may be further operable to receive at least one input signal from the current sensor to generate a control signal that regulates at least the potential applied to the electrochemical cell. In some embodiments, the controller may be further operable to receive at least one input signal from the persulfate concentration sensor to generate a control signal that regulates at least the rate of persulfate introduction to the source of water.

The controller may be further configured to receive input signals from sensors positioned downstream of the electrochemical cell, such as at least the second contaminant concentration sensor and second water flow sensor. In some embodiments, the controller may be further operable to receive at least one input signal from the second contaminant concentration sensor to generate a control signal that regulates at least the rate of introduction of water from the source of water, the rate of persulfate introduction to the source of water, and the potential applied to the electrochemical cell. In some embodiments, the controller may be further operable to receive at least one input signal from the second water flow sensor to generate a control signal that regulates at least the rate of introduction of water from the source of water, the rate of persulfate introduction to the source of water, and the potential applied to the electrochemical cell. As a non-limiting example, the controller may be configured send a control signal to the source of persulfate to administer an amount of the persulfate based on at least a signal received from the second contaminant concentration sensor that measures the concentration of the at least one contaminant in the water after treatment with persulfate free radicals. The resulting measurement from the second contaminant concentration sensor may indicate that the concentration of the at least one contaminant is still greater than an acceptable level, and thus the controller may generate a control signal that instructs the necessary system components to increase the amount of persulfate added to the source of water, decrease the flow of water from the source of water that enters the electrochemical cell, and/or adjust the potential applied to the electrochemical cell. The invention is in no way limited by the number and type of input signals received by the controller from the sensors of the system nor is it in any way limited by the control signals delivered to the output devices of the system from the controller.

As described herein, the sensors and any other system components may be either directly connected to the controller or indirectly connected to the controller using a communication network that is operatively coupled to the controller. For example, sensors may be configured as input devices that are directly connected to the controller. Devices such as metering valves and/or pumps for the source of the persulfate, the pH adjuster, and the conductivity adjuster may be configured as output devices that are connected to the controller, and any one or more of the above may be coupled to another ancillary computer system or component so as to communicate with the controller over a communication network. Such a configuration permits one sensor to be located at a significant distance from another sensor or allow any sensor to be located at a significant distance from any system component and/or the controller, while still providing data therebetween.

In embodiments of the system where a first pH adjustment unit is included upstream of the electrochemical cell, the controller may be further operable to receive at least one input signal from the first pH sensor to generate a control signal that regulates a rate the pH adjuster is introduced from the first pH adjustment unit to the source of water. In embodiments of the system where a second pH adjustment unit is included downstream of the electrochemical cell, the controller may be further operable to receive at least one input signal from the second pH sensor to generate a control signal that regulates a rate the pH adjuster is introduced from the second pH adjustment unit to the treated water. In embodiments of the system where a conductivity adjustment unit is included upstream of the electrochemical cell, the controller may be further operable to receive at least one input signal from the conductivity sensor to generate a control signal that regulates a rate the conductivity adjuster is introduced from the conductivity adjustment unit to the source of water.

The controller may comprise a system processor coupled to a memory device storing instructions configured to execute a decoder function that is configured to program the system processor to provide the instructions to the decoder function. The controller may be implemented using one or more computer systems. The computer system may be, for example, a general-purpose computer such as those based on an Intel CORE®-type processor, a Motorola POWERPC® processor, a Sun ULTRASPARC® processor, a Hewlett-Packard PA-RISC® processor, or any other type of processor or combinations thereof. Alternatively, the computer system may include programmable logic controllers (PLCs), specially programmed, special-purpose hardware, for example, an application-specific integrated circuit (ASIC) or controllers intended for analytical systems.

The controller can include one or more processors typically connected to one or more memory devices, which can comprise, for example, any one or more of a disk drive memory, a flash memory device, a RAM memory device, or other device for storing data. The one or more memory devices can be used for storing programs and data during operation of the water treatment system. For example, the memory device may be used for storing historical data relating to the measured sensor data over a period of time, as well as operating data. Software, including programming code that implements embodiments of the invention, can be stored on a computer readable and/or writeable nonvolatile recording medium, and then typically copied into the one or more memory devices wherein it can then be executed by the one or more processors. Such programming code may be written in any of a plurality of programming languages, for example, ladder logic, Java, Visual Basic, C, C #, or C++, Fortran, Pascal, Eiffel, Basic, COBOL, or any of a variety of combinations thereof.

In accordance with another aspect, there is provided a method of treating water. The method may comprise providing water from a source of water comprising at least one contaminant, measuring a concentration of at least one contaminant in the water from the source of water, introducing a persulfate to the water at a concentration based on a signal representative of at least the measured concentration of the at least one contaminant to produce a first treated water, and introducing the first treated water to an inlet of an electrochemical cell. The method may further include electrochemically generating persulfate free radicals from the persulfate in the electrochemical cell at an electrode comprising a catalytic material to produce a second treated water.

In some embodiments, the method of treating water may further include adjusting the concentration of the persulfate introduced to the water based on at least a signal generated from a measured concentration of the at least one contaminant in the second treated water. In some embodiments, the method of treating water may further include adjusting a potential applied to the electrochemical cell based on at least a signal generated from the measured concentration of the at least one contaminant in the second treated water. In some embodiments, the method of treating water may further include adjusting a rate of introduction of water from the source of water based on at least a signal generated from the measured concentration of the at least one contaminant in the second treated water. The persulfate added to the water to form the first treated water may include at least one of ammonium persulfate, sodium persulfate, and potassium persulfate. In some embodiments of the method of treating water, the persulfate free radicals are generated at a cathode in the electrochemical cell as described herein. In some embodiments of the method of treating water, the at least one contaminant may comprise an organic contaminant.

The method of treating water may further include introducing an amount of at least one of a pH adjuster or conductivity adjuster to the water from the source of water. In some embodiments, the method of treating water may additionally include adjusting the pH of the water from the source of water to a value less than 7. The method of treating water may additionally include introducing the second treated water from the electrochemical cell into a treatment vessel positioned downstream of the electrochemical cell. The pH of the water introduced into the treatment vessel may have a pH adjusted.

In accordance with another aspect, there is provided a method of facilitating water treatment. The method may comprise providing a water treatment system as described herein, with the water treatment system comprising an electrochemical cell as described herein configured to electrochemically activate a persulfate introduced to a source of water comprising at least one contaminant at an electrode comprising a catalytic material for electrochemical generation of persulfate free radicals. The method of facilitating water treatment may further comprise providing at least one of a first contaminant concentration sensor, a first water flow sensor, a current sensor, and a persulfate concentration sensor. The method of facilitating water treatment may additionally comprise providing a controller configured to regulate at least the introduction of water from the source of water, an amount of the persulfate introduced, and a potential applied to electrochemical cell responsive to at least a measured contaminant concentration of the water. The method of facilitating water treatment may further comprise instructing a user to connect the water treatment system to the controller and/or to fluidly connect the electrochemical cell to the water treatment system.

In some embodiments of the method of facilitating water treatment, the method may further include providing the persulfate. In some embodiments of the method of facilitating water treatment, the provided controller may be further configured to regulate at least one of the introduction of water from the source of water, an amount of the persulfate introduced, and a potential applied to the electrochemical cell responsive to at least one of a measured water flow rate, a measured persulfate concentration, and a measured current of the electrochemical cell.

In accordance with another aspect, there is provided a method of retrofitting a water treatment system comprising an advanced oxidation process (AOP) in fluid communication with a source of water comprising at least one contaminant. The method may comprise providing an electrochemical cell including a cathode comprising a catalytic material for electrochemical generation of persulfate free radicals. The method may further comprise fluidly connecting the electrochemical cell to the source of water. The method may additionally comprise providing instructions to operate the electrochemical cell to activate a persulfate introduced into the source of water to produce a treated water.

In some embodiments of the method of retrofitting, the method may further include replacing an ultraviolet (UV) AOP from the water treatment system. In some embodiments of the method of retrofitting, the electrochemical cell may be provided with a cathode that comprises a metal selected from the group consisting of iron, copper, nickel, cobalt, and metal alloys. In some embodiments of the method of retrofitting, the electrochemical cell may be provided with an anode that comprises a material selected from the group consisting of platinum, a Magnéli phase titanium oxide, a MMO coated DSA material, graphite, BDD, or lead/lead oxide.

In some embodiments of the method of retrofitting, the method may further include providing the persulfate. In some embodiments of the method of retrofitting, the method may further include providing a controller as described herein that may be configured to regulate at least a rate of introduction of water from the source of water, a rate the persulfate is introduced to the source of water, and a potential applied to the electrochemical cell.

EXAMPLES

The function and advantages of these and other embodiments can be better understood from the following examples. These examples are intended to be illustrative in nature and are not considered to be in any way limiting the scope of the invention.

Cathodes used for the examples described herein include stainless steel 304 (SS304), nickel metal mesh, cobalt metal foil, and copper metal mesh. SS304 was purchased from McMaster-Carr Supply Company (product no. 85385T88). Prior to the experiments, the SS304 mesh was folded and pressed into a desired shape to fit into the cell container and washed using deionized (DI) water in a sonicator for 5 min. Nickel mesh (catalog no. AA3970405) and cobalt foils (catalog no. AA42659FI) were purchased from Thermo Fisher Scientific. Copper mesh was purchased from McMaster-Carr (product no. 9224T49). Similar cleaning procedures were adopted for the nickel, cobalt, and copper cathodes before experiments. Two platinum-coated titanium electrodes from Evoqua Water Technologies were used as anodes throughout all experiments. The geometric size of the active area of each anode is 6 $cm^2$.

All reagents used in the examples, including 1,2,4-triazole, t-butanol (TBA), sodium sulfate, sodium persulfate, and perfluorooctanoic acid (PFOA) were analytical grade chemicals purchased from Alfa Aesar and used without further purification. Humic acid was purchased from Sigma Aldrich (catalog number: H16752).

TOC (total organic carbon) measurements were conducted using a Shimadzu TOC LCPH/CPN analyzer equipped with a platinum catalyzed oxygen combustion tube. The furnace temperature was set to 720° C. and the NPOC (non-purgeable organic carbon) method was employed to report the concentrations of organics in water as TOC values. The purging time was 90 s. UV-Vis absorption spectra were collected using a Hach 6000 spectrometer with a wavelength scanning speed of 1 nm/s. Chemical oxygen demand (COD) values were measured using a Hach TNT 821 meter. The measurement of PFOA was performed using ion chromatography (IC) with the instrument equipped with a PRONTOSIL HPLC column (Bischoff Chromatography, Leonberg, Germany). A solution of 10 mM boric acid and 10% acetonitrile (adjusted to pH 8) was employed as the mobile phase.

To illustrate the efficacy of direct electrochemical activation of persulfate for removing organic molecules from water, the following examples describe experiments where different organics molecules were added to deionized water to simulate both naturally occurring and man-made contamination in water.

Example 1

This example illustrates the removal of 1,2,4-triazole, a man-made organic molecule typically used as a building block for pharmaceutical products, from water using an electrochemical cell as described herein. A solution of 10 ppm 1,2,4-triazole was dispensed in an electrochemical cell having a 2-electrode configuration. The electrochemical cell employed SS304 mesh as the cathode and a platinum-coated titanium as the anode. The surface area of the SS304 mesh cathode used was about 0.5 m$^2$. For insertion into the electrochemical cell, the SS304 mesh was folded and pressed into a block with a size of about 5 cm×6 cm×3 cm. Prior to the experiment, 250 mL of 10 ppm 1,2,4-triazole in DI water was freshly prepared and 5 mM of $Na_2SO_4$ was added to improve the solution conductivity. The experiment was conducted in batch mode. A magnetic stir bar was used to improve water flow in the electrochemical cell. To start the experiment, a solution of 2000 ppm $Na_2S_2O_8$ was added into the water and a DC current of 40 mA was applied in the electrochemical cell. TOC data, that is, total 1,2,4-triazole concentration data, was collected every 1 hour after the electrochemical cell was energized.

Figure 4:
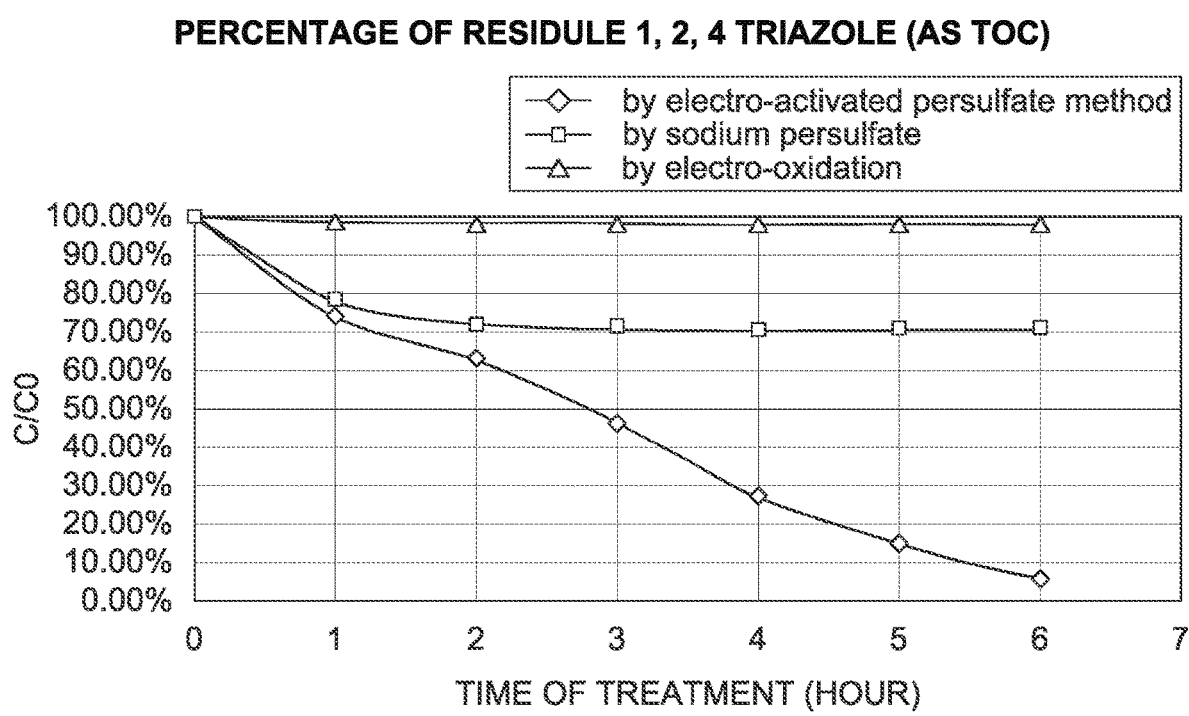
FIG. 4 illustrates the removal of 1,2,4-triazole using an electrochemical cell, according to one embodiment.

The results of this experiment are illustrated in FIG. 4. As is seen, 1,2,4-triazole was continuously removed by the persulfate radicals produced in the electrochemical cell. After 6 hours of run time, the measured TOC decreased to 6.25% of the initial 1,2,4-triazole concentration ($C_0$). These results suggest that the production of persulfate radicals using an electrochemical cell may be an effective system for the elimination of 1,2,4-triazole, as well as its intermediates, during the oxidation process.

To verify that there was no influence on electrochemical cell performance from the chemical oxidation of the $Na_2S_2O_8$ oxidant or electrochemical oxidation of the platinum anode, control experiments were also conducted using the same electrochemical cell configuration. The results of the control experiments are also illustrated in FIG. 4 and indicate that neither $Na_2S_2O_8$ nor DC potential alone were effective for removing 1,2,4-triazole from the water.

Example 2

This example illustrates the removal of t-butanol (TBA), typically found in commercial fuels and coatings, from water using an electrochemical cell as described herein. A solution of TBA at a concentration of 10 ppm was treated using the same electrochemical cell setup (a stainless steel (SS304 cathode)) and followed the same data collection procedure as described in Example 1.

Figure 5:
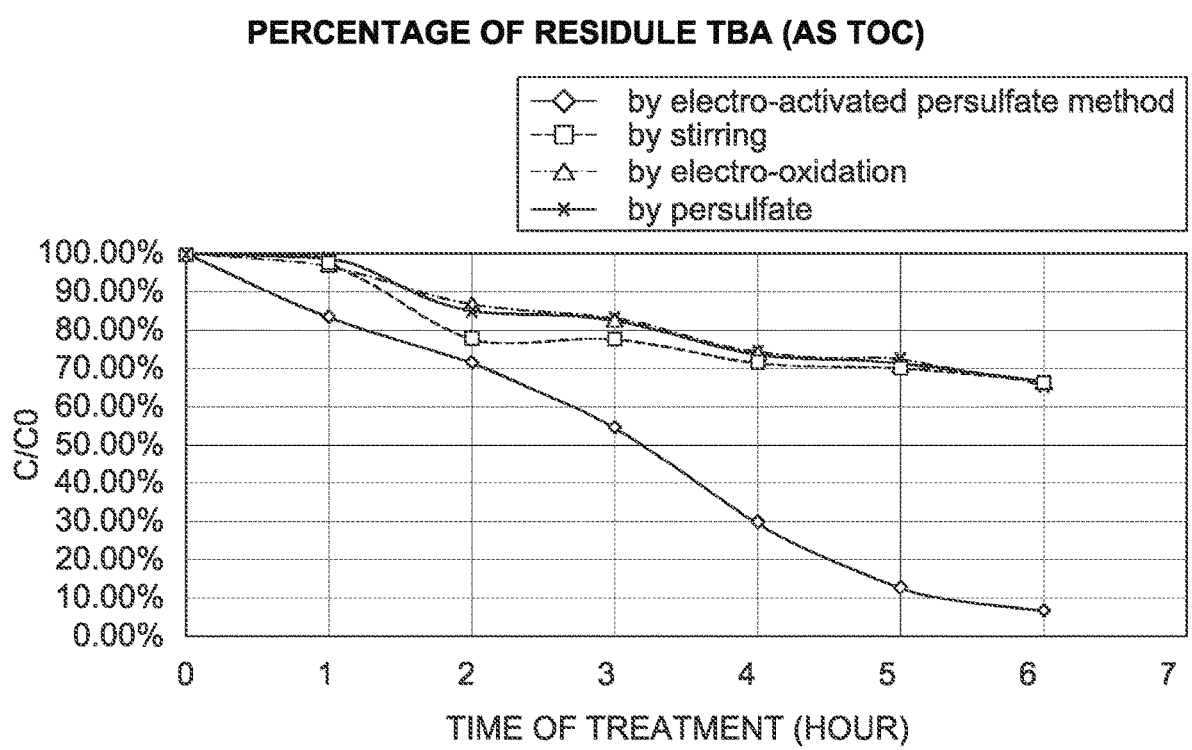
FIG. 5 illustrates the removal of t-butanol (TBA) using an electrochemical cell, according to one embodiment.

The results of this experiment are illustrated in FIG. 5. Similar to the experiment for the removal of 1,2,4-triazole described in Example 1, t-butanol was continuously removed by the persulfate radicals produced in the electrochemical cell. After 6 hours of run time, 93% of the initial t-butanol concentration, and any formed intermediates, were removed from the water. Control experiments performed in the same manner as Example 1 indicated that $Na_2S_2O_8$ or DC potential alone were ineffective to remove t-butanol from the water. It is noted that the concentration of t-butanol was found to decrease by stirring the mixture of t-butanol and water without persulfate added to the mixture or the application of a DC potential applied in the cell. This suggests that the high vapor pressure of t-butanol may increase its release from the mixture prior to electrochemical processing.

Example 3

This example illustrates the removal of humic acid from water using an electrochemical cell as described herein. A solution of 12 ppm humic acid was treated using the same electrochemical cell setup (a stainless steel (SS304 cathode)) and followed the same data collection procedure as described in Examples 1 and 2.

Figure 6:
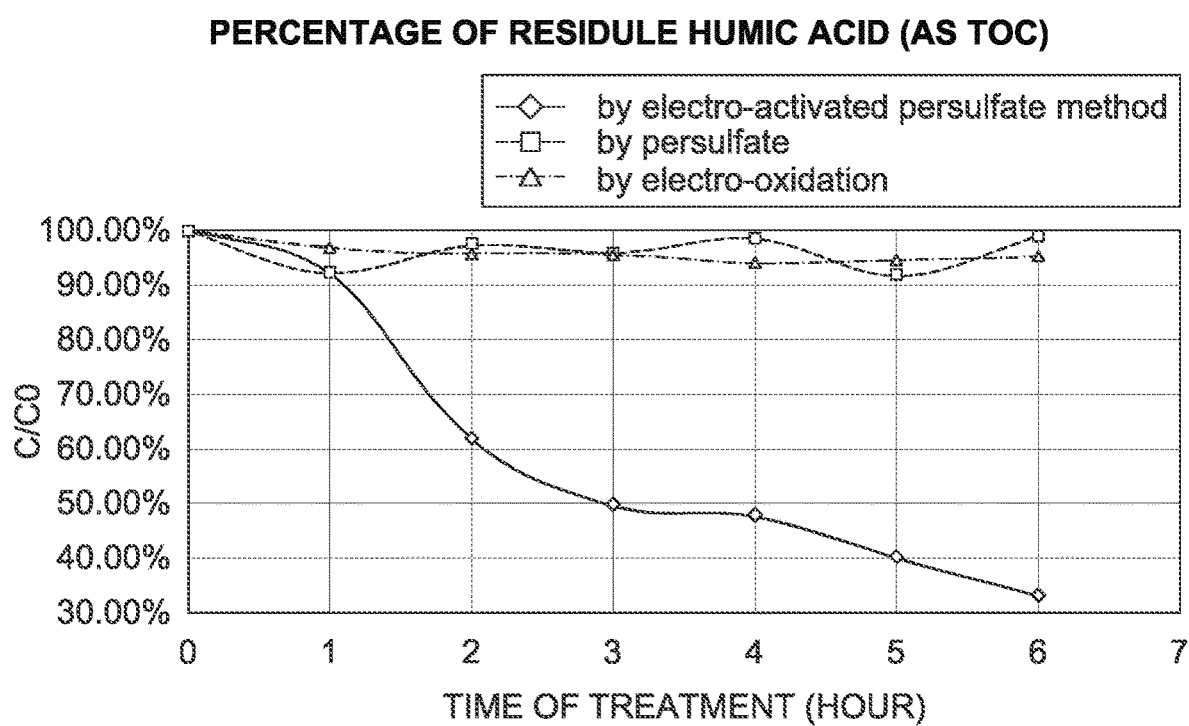
FIG. 6 illustrates the removal of humic acid using an electrochemical cell, according to one embodiment.

The results of this experiment are illustrated in FIG. 6. After 6 hours of run time, about 70% of the initial humic acid concentration, and any formed intermediates, were removed from the water. The lower efficiency of humic acid removal using the electrochemical treatment, compared to 1,2,4-triazole and t-butanol as described in Examples 1 and 2, respectively, was attributed to the large molecules of humic acid that have complicated oxidation reactions and thus inhibit reaction kinetics.

Example 4

This example illustrates the removal of perfluorooctanoic acid (PFOA) from water using an electrochemical cell as described herein. PFOA and similar PFAS molecules have garnered attention as of late due to their long lifetimes in the environment where their extreme hydrophobicity as well as negligible rates of natural decomposition result in environmental persistence and bioaccumulation.

In this example, a solution of 12 ppm PFOA was treated using the same electrochemical cell setup (a stainless steel (SS304 cathode)) as described in Examples 1-3 with a modified data collection procedure described below. For the experiment, 250 mL of 10 ppm PFOA in DI water was freshly prepared and 2 mM of $NaClO_4$ was added to improve the solution conductivity. The experiment was conducted in batch mode. A magnetic stirring bar was used to improve water flow within the electrochemical cell. To start the experiment, separate solutions of 4000 ppm and 6000 ppm $Na_2S_2O_8$ were added into separate samples of the PFOA contaminated water and a DC current of 20 mA was applied to each electrochemical cell. The experiment was stopped after 20 hours of treatment when all of the $Na_2S_2O_8$ in both experiments was fully activated and converted to $SO_4^{2-}$.

Figure 7:
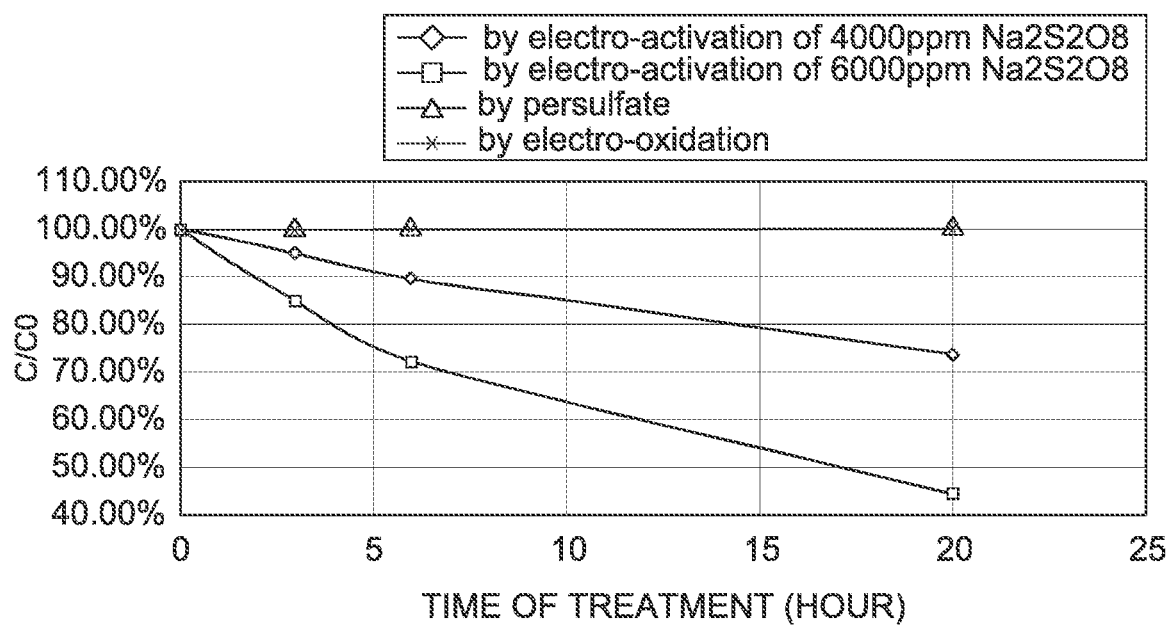
FIG. 7 illustrates the removal of perfluorooctanoic acid (PFOA) using an electrochemical cell, according to one embodiment.

The results of this experiment are illustrated in FIG. 7. Persulfate alone does not react with PFOA due to its insufficient oxidation potential and the kinetic restriction of the electrooxidation of PFOA on the platinum anode. In contrast, the initial concentration of PFOA treated using the electrochemical cell with 6000 ppm persulfate was reduced by 55.5% after the 20 hours of electrochemical cell run time. Higher removal rates may be further expected when higher persulfate dosages or multi-stage electrochemical treatments are utilized.

Example 5

This example illustrates the removal of humic acid from water using an electrochemical cell as described herein. The experiment was conducted in a lab beaker electrochemical cell using a cathode made from nickel mesh or cobalt foil (5 cm×5 cm) and an anode made from a platinum-coated dimensionally stable electrode with an active area of 6 cm$^2$. The nickel mesh used for the cathode has an active area of about 800 cm$^2$ which was folded and pressed to fit into the beaker electrochemical cell. A cathodic current of 20 mA was applied on the cathode after 2000 ppm $Na_2S_2O_8$ was added.

Figure 8:
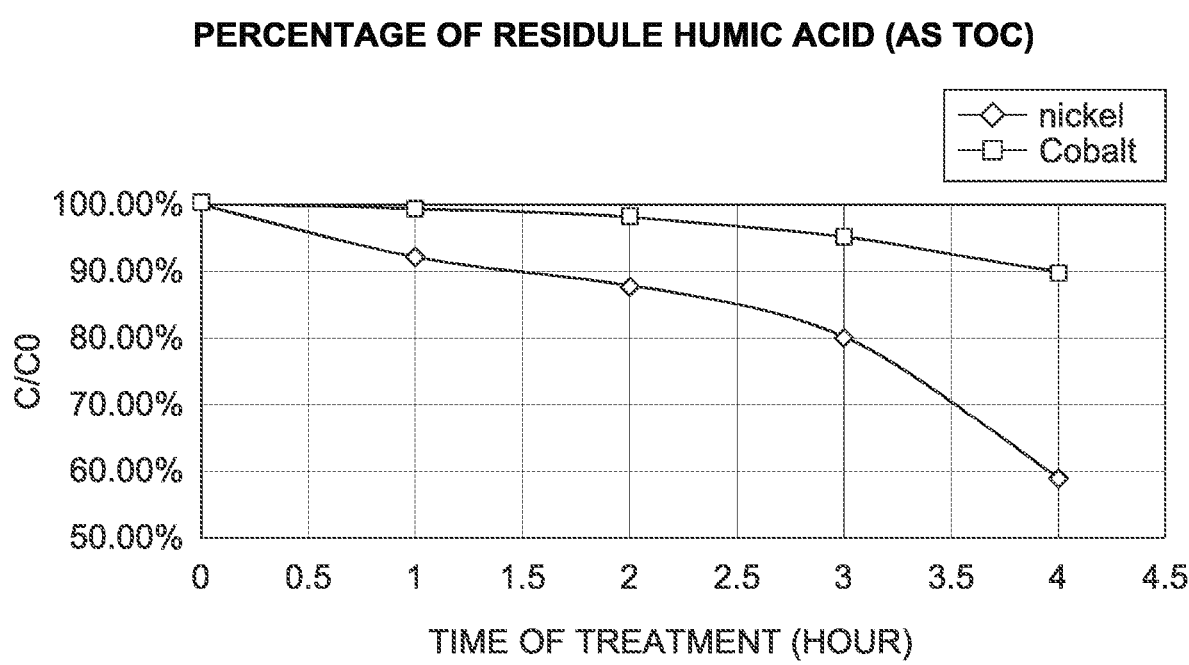
FIG. 8 illustrates the removal of humic acid using an electrochemical cell, according to one embodiment.

The results of these experiments are illustrated in FIG. 8. Over the course of the experiment, the concentration of humic acid and its intermediates continually decreased using both nickel and cobalt cathodes. For example, as illustrated in FIG. 8, after 4 hours of electrochemical treatment, the initial humic acid concentration decreased to 58.74% and 90% on nickel and cobalt cathodes, respectively. As with the experiment described in Example 3, the effects of concentration reduction due to the influence of direct oxidation on platinum coated titanium anodes or by inactivated sodium persulfate were negligible. This indicated that all of the humic acid elimination in this experiment is attributed to electro-catalytic activation of persulfate on a nickel or cobalt electrode.

Example 6

This example illustrates the removal of humic acid from water using an electrochemical cell as described herein. The experiment was conducted in a lab beaker electrochemical cell using a cathode made from copper mesh and an anode made from a platinum-coated dimensionally stable electrode with an active area of 6 cm$^2$. The copper mesh had a surface area of about 200 cm$^2$ and was folded and pressed to fit into the beaker cell.

For the experiment, 80 mL of 12 ppm humic acid in DI water was freshly prepared before the experiment. Solutions of 5 mM $Na_2SO_4$ and 1 mM $H_2SO_4$ were then added into the humic acid solution to enhance the conductivity and to adjust pH. Separate aliquots of 300 ppm and 600 ppm $Na_2S_2O_8$ were dosed into each humic acid solution. The electrochemical cell was then connected to an external DC power supply and fixed currents applied (60 mA and 20 mA) for 1 hour. After the treatments, samples from each cell were analyzed using the Hach TNT 821 meter (having a detection range 2-150 ppm) to track chemical oxygen demand (COD) through the experiment.

Figure 9:
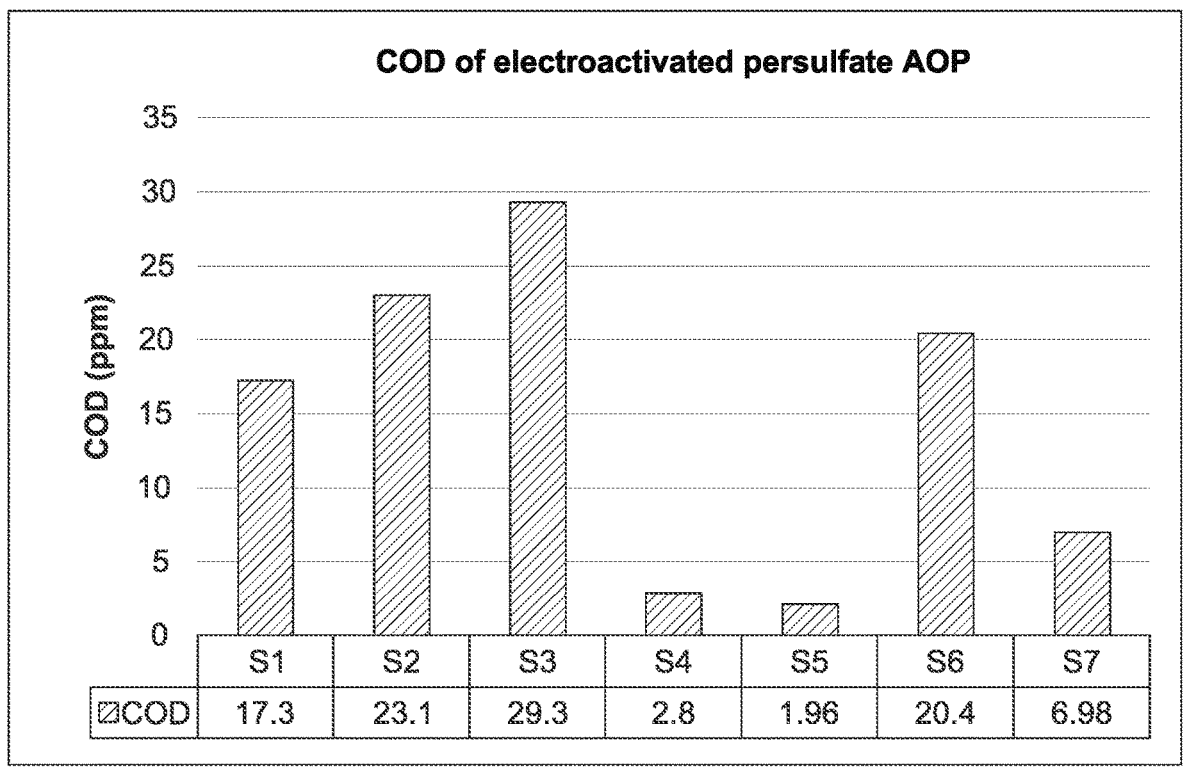
FIG. 9 illustrates the removal of humic acid using an electrochemical cell, according to one embodiment.

The results of these experiments are illustrated in FIG. 9. FIG. 9 also illustrates the results of control experiments using a cathode fabricated from $IrO_2$-coated Ti. The legends of FIG. 9 are as follows:
- S1—Sample before electrochemical treatment (12 ppm humic acid, 0 ppm $Na_2S_2O_8$, 1 mM $H_2SO_4$)
- S2—Sample before electrochemical treatment (12 ppm humic acid, 300 ppm $Na_2S_2O_8$, 1 mM $H_2SO_4$)
- S3—Sample before electrochemical treatment (12 ppm humic acid, 600 ppm $Na_2S_2O_8$, 1 mM $H_2SO_4$)
- S4—Sample after electrochemical treatment (12 ppm humic acid, 600 ppm $Na_2S_2O_8$, 1 mM $H_2SO_4$, copper mesh cathode, applied current of 60 mA)
- S5—Sample after electrochemical treatment (12 ppm humic acid, 600 ppm $Na_2S_2O_8$, 1 mM $H_2SO_4$, copper mesh cathode, applied current of 20 mA)
- S6—Sample after electrochemical treatment (12 ppm humic acid, 600 ppm $Na_2S_2O_8$, 1 mM $H_2SO_4$, $IrO_2$-coated Ti cathode, applied current at 60 mA)
- S7—Sample treated by direct oxidation in $Na_2S_2O_8$ with copper mesh cathode immersed in the solution (12 ppm humic acid, 600 ppm $Na_2S_2O_8$, 1 mM $H_2SO_4$, no applied current)

As is seen in FIG. 9, electrochemically activated persulfate treatment using a copper cathode demonstrated the highest efficiency for COD reduction, and thus the largest decrease in the humic acid concentration in the sample. The COD was reduced to about 2 ppm (which is the lower detection limit of the Hatch TNT 821 meter) after treatment, independent of whether the current applied on the electrode was 60 mA or 20 mA. In comparison, the electrochemical cell using an $IrO_2$-coated Ti cathode did not effectively catalyze persulfate activation as evidenced by the residual COD after the treatment having a measured value of 20.4 ppm. COD reduction by persulfate alone was also found to occur; this was attributed to additional heterogeneous catalytic surface area provided by the copper mesh cathode which can directly oxidize persulfate even under conditions with no current applied. It was also observed that there was a sodium persulfate concentration dependence on the reduction of COD, believed to arise from sodium persulfate interference.

Figure 10:
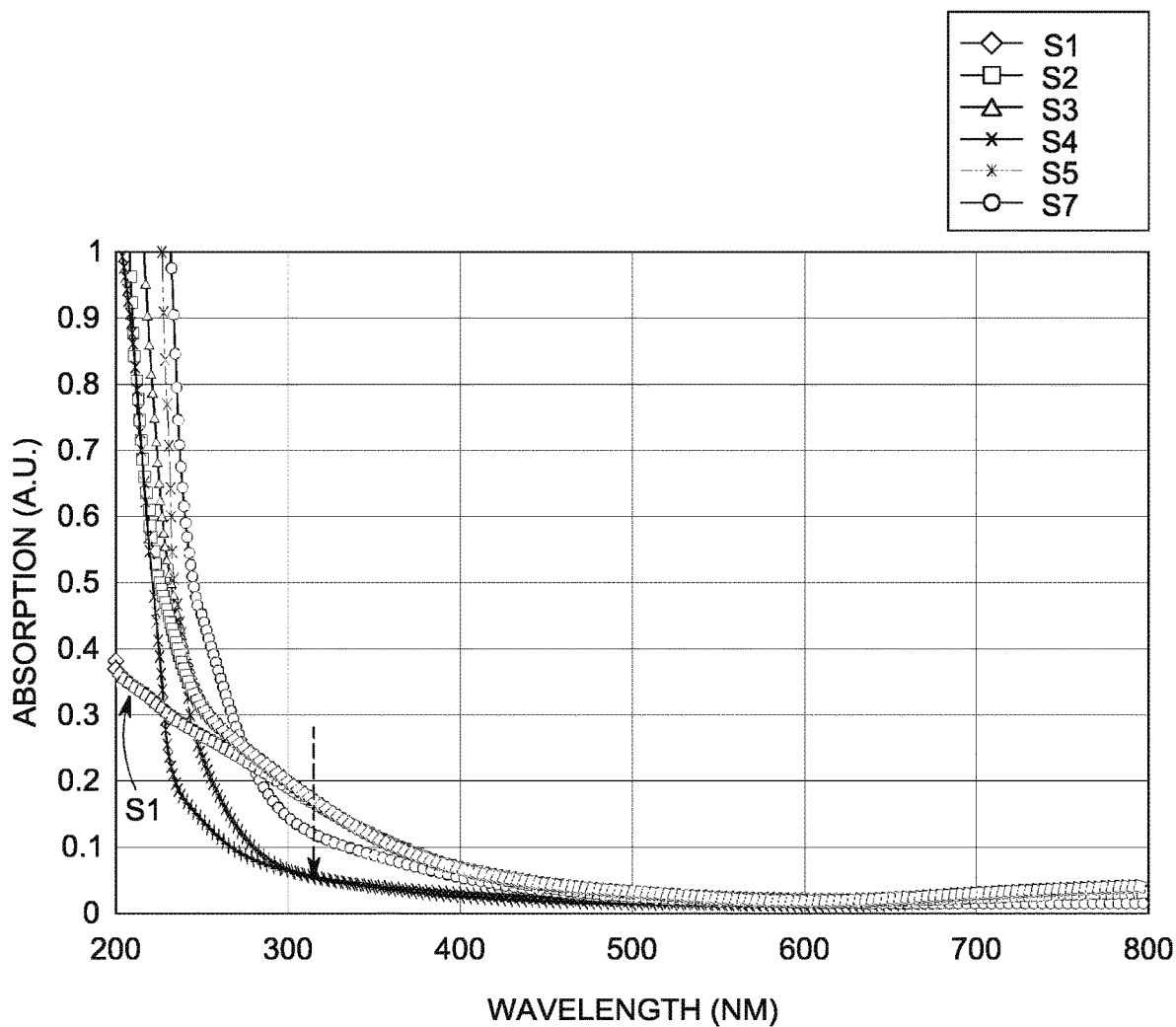
FIG. 10 illustrates the UV-Vis spectra before and after the removal of humic acid using an electrochemical cell, according to one embodiment.

The decomposition of humic acid using an electrochemical cell with a copper cathode was further supported by UV-Vis absorption spectroscopy as illustrated in FIG. 10. After treatment with electrochemically activated persulfate, the UV-Vis absorption spectrum from 300 nm to 500 nm, where absorption of humic acid occurs, was reduced after treatment.

Example 7

This example illustrates the removal of multiple contaminants from a solution using an electrochemical cell as described herein. In this example, a solution containing 12 ppm humic acid and 2 ppm of the aromatic dye methylene blue (MB) was treated with the electrochemical cell described in Example 6 and used the same data collection procedures.

Figure 11:
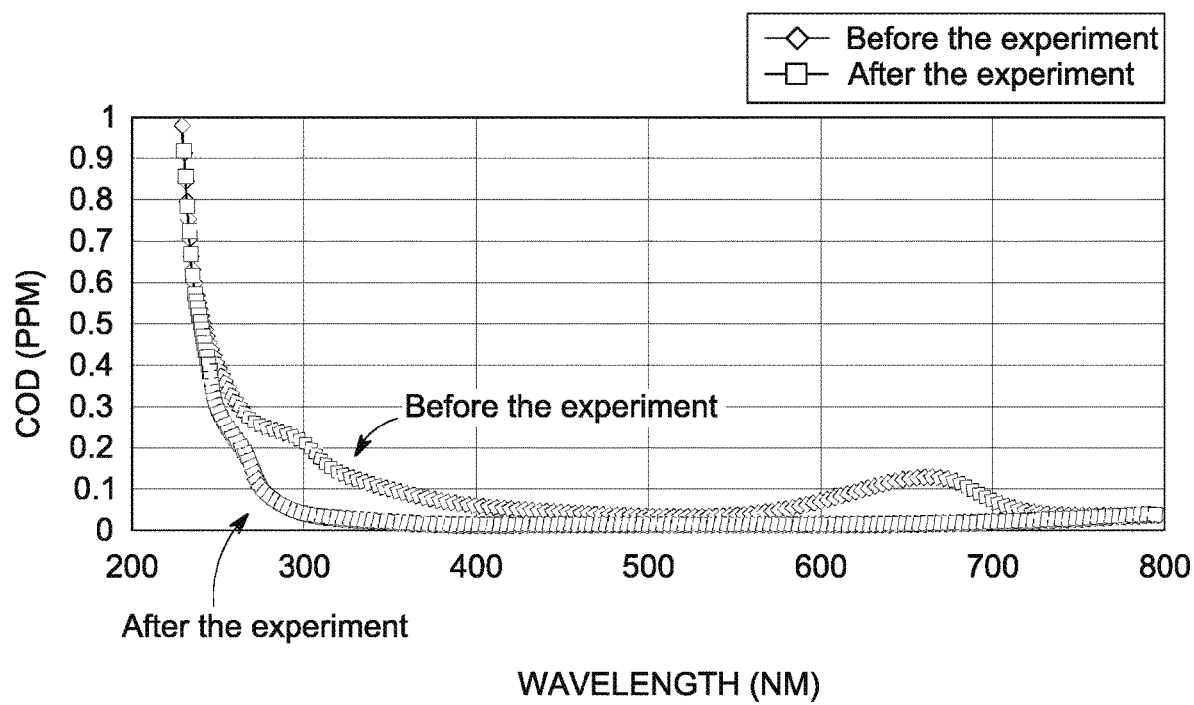
FIG. 11 illustrates the UV-Vis spectra before and after the removal of humic acid and methylene blue using an electrochemical cell, according to one embodiment.

For the experiment, a 10 mA DC current was applied to the electrochemical cell. The COD reduction to ~0.015 ppm after the treatment was significantly lower that the limit of detection of the Hatch TNT 821 meter (LOD of 2 ppm), indicating the efficient removal of both compounds from the sample water. The efficient removal of both compounds was further supported by measurement of the UV-Vis absorption spectra before and after the treatment. As illustrated in FIG. 11, the characteristic UV-Vis absorption peaks between 300 nm to 500 nm, where absorption of humic acid occurs, and at 671 nm for MB, were both reduced after the electrochemical treatment.

Example 8

This example illustrates a comparison in the removal efficiency for organics in industrial site water between a commercially available UV-based persulfate activation system (a VANOX® system available from Evoqua Water Technologies, Pittsburgh, PA) and an electrochemical cell as described herein. The UV-based persulfate activation system was equipped with a 1 kW low pressure UV lamp. The electrochemical cell used for this example was the electrochemical cell described in Example 1, that is, an electrochemical cell with SS304 mesh as the cathode and a platinum-coated titanium as the anode. The industrial site water used for this example was taken from a semiconductor manufacturing fabrication operation and had an initial TOC concentration of 60 ppm. For treatment with the UV-based persulfate activation system, 3.5 L of the industrial site water was dosed with a solution of 8000 ppm $Na_2S_2O_8$. For treatment with the electrochemical cell, 250 mL of the industrial site water was dosed with a solution of 8000 ppm $Na_2S_2O_8$.

TABLE 1

Energy expenditure (kWh/m³) for treating industrial site water

| Time (h) | UV system | Time (h) | Electrochemical cell |
|---|---|---|---|
| 0 | — | 0 | — |
| 1 | 285.71 | 3 | 1.92 |
| 2 | 571.43 | 6 | 3.84 |
| 3 | 857.14 | 9 | 5.76 |
| 4 | 1142.86 | 12 | 7.68 |
| 5 | — | 15 | 9.60 |
| 6 | — | 18 | 11.52 |

Figure 12:
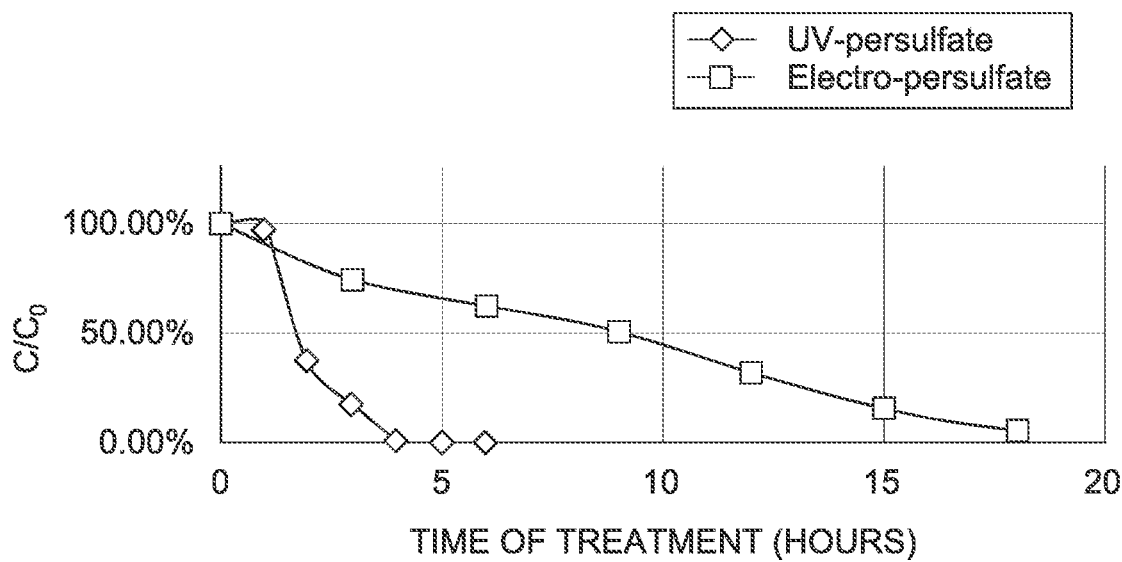
FIG. 12 illustrates a comparison in the efficiency of TOC removal from contaminated industrial site water using UV generation of persulfate radicals and an electrochemical cell, according to one embodiment.
Figure 13:
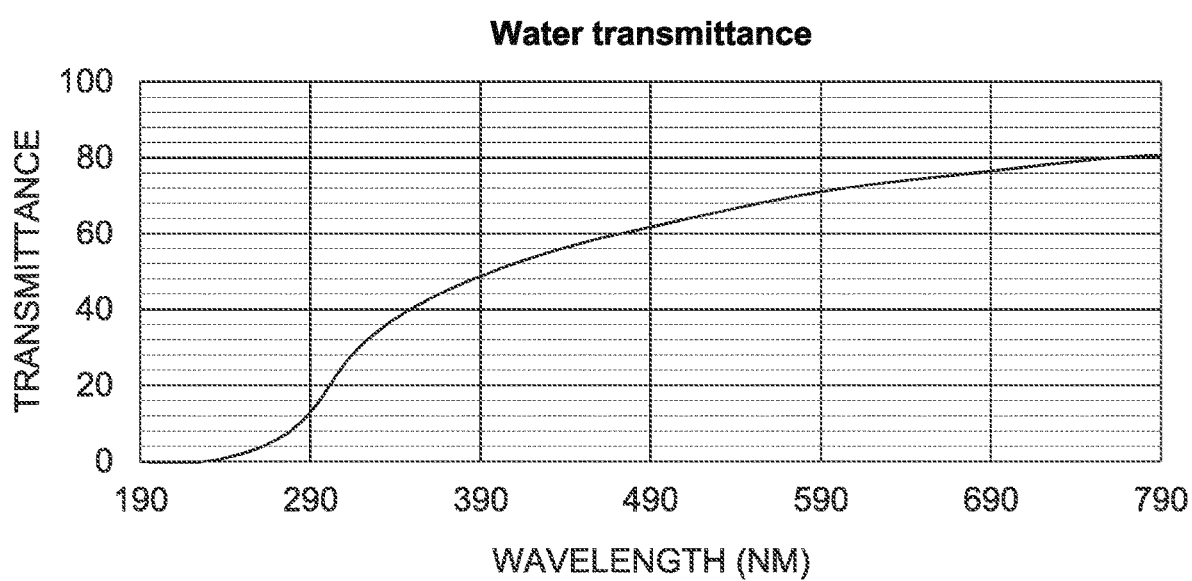
FIG. 13 illustrates the UV transmittance of the industrial site water illustrated in FIG. 12.

The results of this experiment are illustrated in FIG. 12. As is seen, both UV activation and electrochemical activation of persulfate reduced the TOC of the industrial site water to approximately the same concentration after process run times of up to 4 hours for the UV-based persulfate activation system and 18 hours for the electrochemical cell. Table 1 provides a comparison of the energy expenditure for each process for the treatment of the industrial site water scaled up to a volume of 1 m³ over their respective run times, with the calculated cumulative energy consumed during each process in bold type. As Table 1 illustrates, treatment using the electrochemical cell would consume about 1% of the energy required to operate the UV-based persulfate activation system to produce treated water with approximately the same final TOC concentration. The reduced energy efficiency of the UV-based persulfate activation system may be attributed to the low UV transmittance in the industrial site water, with the UV transmittance as a function of wavelength for this specific water illustrated in FIG. 13.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A system for treating water comprising:
an electrochemical cell having an inlet and an outlet, the inlet of the electrochemical cell fluidly connectable to a source of water comprising at least one contaminant, the electrochemical cell comprising:
a cathode comprising a catalytic material selected from the group consisting of copper, nickel, and cobalt for electrochemical generation of persulfate free radicals; and
an anode comprising platinum;
a source of a persulfate positioned upstream of the electrochemical cell and fluidly connectable to the source of water;
a first contaminant concentration sensor positioned upstream of the electrochemical cell and fluidly connectable to the source of water;
a first water flow sensor positioned upstream of the electrochemical cell and fluidly connectable to the source of water and a second water flow sensor positioned downstream of the electrochemical cell; and
a controller operatively coupled to receive one or more input signals from at least the first contaminant concentration sensor and the second water flow sensor, the controller operable to generate a control signal that regulates at least a rate of introduction of water from the source of water, a rate of persulfate introduction to the source of water, and a potential applied to the electrochemical cell based on the one or more input signals.

2. The system of claim 1, wherein the first contaminant concentration sensor comprises an organic contaminant concentration sensor.

3. The system of claim 1, wherein the persulfate comprises at least one of ammonium persulfate, potassium persulfate, and sodium persulfate.

4. The system of claim 1, wherein the cathode material comprises copper.

5. The system of claim 1, further comprising a first water flow sensor positioned upstream of the electrochemical cell and fluidly connectable to the source of water.

6. The system of claim 5, wherein the controller is further operable to receive at least one input signal from the first water flow sensor to generate a control signal that regulates at least the rate of introduction of water from the source of water.

7. The system of claim 1, further comprising a current sensor coupled to the electrochemical cell.

8. The system of claim 7, wherein the controller is further operable to receive at least one input signal from the current sensor to generate a control signal that regulates at least the potential applied to the electrochemical cell.

9. The system of claim 1, further comprising a persulfate concentration sensor fluidly connectable to the source of water.

10. The system of claim 9, wherein the controller is further operable to receive at least one input signal from the persulfate concentration sensor to generate a control signal that regulates at least the rate of persulfate introduction to the source of water.

11. The system of claim 1, further comprising a second contaminant concentration sensor positioned downstream of the outlet of the electrochemical cell and fluidly connectable to the outlet of the electrochemical cell.

12. The system of claim 11, wherein the controller is further operable to receive at least one input signal from the second contaminant concentration sensor to generate a control signal that regulates at least the rate of introduction of water from the source of water, the rate of persulfate introduction to the source of water, and the potential applied to the electrochemical cell.

13. The system of claim 1, further comprising a first pH sensor positioned upstream of the electrochemical cell and fluidly connectable to the source of water.

14. The system of claim 13, further comprising a first pH adjustment unit positioned upstream of the electrochemical cell and fluidly connectable to the source of water.

15. The system of claim 14, wherein the first pH adjustment unit is configured to adjust the pH of the source of water to a pH less than 7.

16. The system of claim 15, wherein the controller is further operable to receive at least one input signal from the first pH sensor to generate a control signal that regulates a rate the pH adjuster is introduced from the first pH adjustment unit to the source of water.

* * * * *